United States Patent
Nieminen et al.

(10) Patent No.: US 10,246,309 B2
(45) Date of Patent: Apr. 2, 2019

(54) OPTICAL MEASUREMENT DEVICE, LOAD HANDLING APPARATUS, METHOD FOR PROTECTING OPTICAL MEASUREMENT DEVICE AND METHOD FOR UPDATING LOAD HANDLING APPARATUS

(71) Applicant: KONECRANES GLOBAL CORPORATION, Hyvinkää (FI)

(72) Inventors: Ari Nieminen, Hyvinkää (FI); Jorma Merimaa, Hyvinkää (FI); Hannu Jyväsjärvi, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 0 days.

(21) Appl. No.: 15/128,600

(22) PCT Filed: Mar. 26, 2015

(86) PCT No.: PCT/EP2015/056521
§ 371 (c)(1),
(2) Date: Sep. 23, 2016

(87) PCT Pub. No.: WO2015/144809
PCT Pub. Date: Oct. 1, 2015

(65) Prior Publication Data
US 2018/0044144 A1    Feb. 15, 2018

(30) Foreign Application Priority Data
Mar. 28, 2014   (EP) .................................. 14162277

(51) Int. Cl.
*G08B 21/00* (2006.01)
*B66C 13/46* (2006.01)
(Continued)

(52) U.S. Cl.
CPC ............. *B66C 13/46* (2013.01); *B66F 9/0755* (2013.01); *G01S 7/4813* (2013.01); *G01S 17/42* (2013.01)

(58) Field of Classification Search
CPC ......... B66C 13/46; B66F 9/0755; G01S 17/42
(Continued)

(56) References Cited

U.S. PATENT DOCUMENTS

2007/0158317 A1* 7/2007 Brix ................... C03B 33/091
219/121.72
2009/0155605 A1  6/2009 Lee et al.
2011/0251685 A1* 10/2011 Chu ................... B29D 11/023
623/6.43

FOREIGN PATENT DOCUMENTS

CN    2555193 Y    6/2003
CN   101231447 A   7/2008
(Continued)

OTHER PUBLICATIONS

Chinese Office Action and Search Report, dated Sep. 22, 2017, for Chinese Application No. 201580016169.9, with English translations.
(Continued)

*Primary Examiner* — Mark S Rushing
(74) *Attorney, Agent, or Firm* — Birch, Stewart, Kolasch & Birch, LLP

(57) ABSTRACT

There is provided an optical measurement device, a load handling apparatus, a method for protecting an optical measurement device and a method for updating a load handling apparatus, where the optical measurement device comprises a permeable surface for communicating light to and from the optical measurement device. A hydrophilic coating is arranged on the permeable surface.

12 Claims, 3 Drawing Sheets

(51) Int. Cl.
    *B66F 9/075*     (2006.01)
    *G01S 17/42*     (2006.01)
    *G01S 7/481*     (2006.01)

(58) Field of Classification Search
    USPC ...................................................... 340/686.6
    See application file for complete search history.

(56) References Cited

FOREIGN PATENT DOCUMENTS

| | | |
|---|---|---|
| CN | 201532488 U | 7/2010 |
| EP | 0737513 B1 | 5/2002 |
| EP | 2 375 264 A1 | 10/2011 |
| EP | 2 562 128 A1 | 2/2013 |
| JP | 7-12889 Y2 | 3/1995 |
| JP | 11-81250 A | 3/1999 |
| JP | 2002-11821 A | 1/2002 |
| JP | 2002-249739 A | 9/2002 |
| JP | 2005-312809 A | 11/2005 |
| JP | 2006-118327 A | 5/2006 |
| JP | 2008-149388 A | 7/2008 |
| JP | 2010-1182 A | 1/2010 |
| JP | 2010-509048 A | 3/2010 |
| JP | 2010-101919 A | 5/2010 |
| JP | 5199807 B2 | 5/2013 |
| WO | WO 96/13327 A1 | 5/1996 |
| WO | WO 2013/011199 A1 | 1/2013 |
| WO | WO 2013/011199 A8 | 1/2013 |

OTHER PUBLICATIONS

Japanese Office Action, dated Oct. 3, 2017, for Japanese Application No. 2016-558716, with English translation.

Japanese Office Action, dated Sep. 4, 2018, for Japanese Application No. 2016-558716, with English translation.

\* cited by examiner

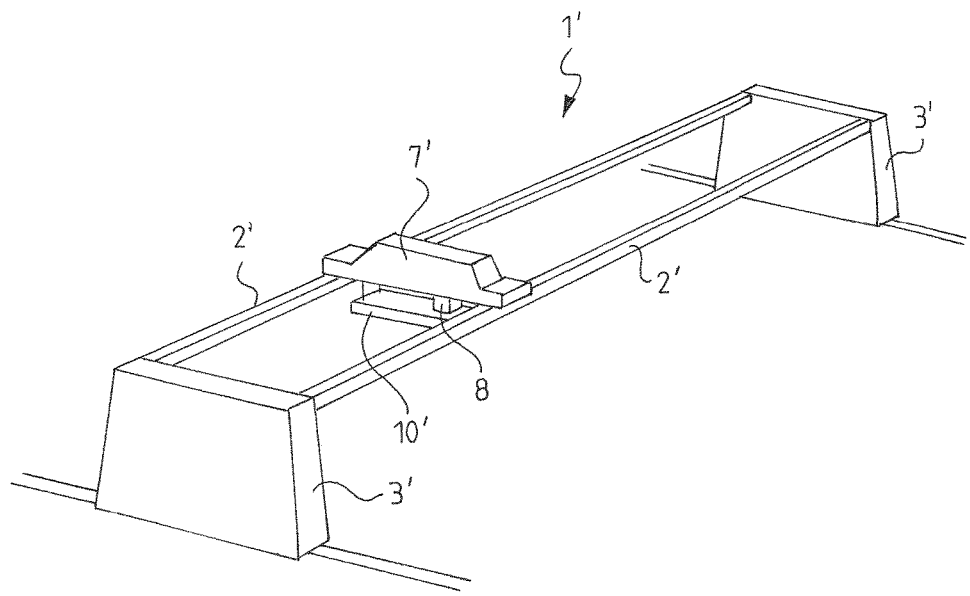
Fig. 3
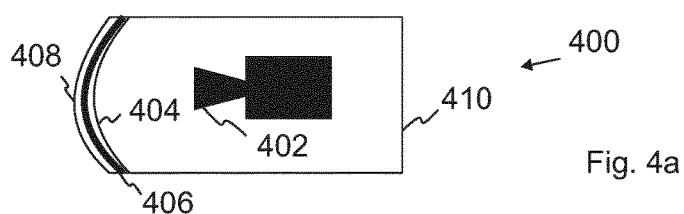
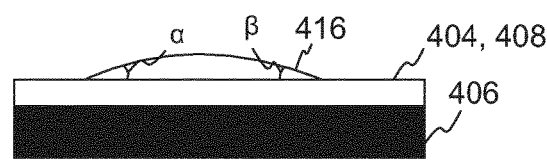
Fig. 4a
Fig. 4b
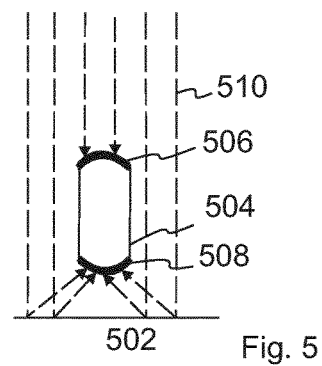
Fig. 5

OPTICAL MEASUREMENT DEVICE, LOAD HANDLING APPARATUS, METHOD FOR PROTECTING OPTICAL MEASUREMENT DEVICE AND METHOD FOR UPDATING LOAD HANDLING APPARATUS

FIELD

The invention relates to an optical measurement device and particularly to an optical measurement device in a load handling apparatus.

BACKGROUND

Gantry cranes are typically used to handle cargo in ports, where they are exposed to various weather conditions such as rain. Driving of the gantry cranes requires great precision, for example when picking up and stacking cargo containers. Accidents in cargo handling using gantry cranes can have serious consequences to the equipment and personnel involved in the accident. In the case an accident takes place, the cargo handling operation using the gantry crane is stopped. The single accident may have consequences also to cargo handling of other cranes, for example by blocking another crane from moving over a stack of containers. Thereby accidents can reduce operational efficiency of the cranes and even the whole port.

Laser scanners are used in gantry cranes for aiding in driving the cranes and cargo. Laser scanners transmit laser beams through a surface permeable to laser light, and receive reflected laser beams back through the surface. The transmitted and reflected lasers are used to measure distances to objects. In order to facilitate correct operation of the laser scanner, the permeable surface that the laser beams travel through should be clean from dirt and water. However, depending on the weather conditions, e.g. rain, humidity, fast temperature changes, water in the form of rain drops or fog, can be formed on the surface. On the other hand particles such as pollen may accumulate to the surface over time. However, the pollen and water cause attenuation, refraction and scattering of the laser beams that travel through the surface, which cause inaccuracy to the operation of the laser scanners. In small amounts, the inaccuracies may slow down the cargo handling by the gantry cranes, but in high amounts the inaccuracies may cause accidents that endanger the equipment and nearby personnel. Cleaning the water and dirt from the laser scanners may be dangerous and time consuming, due to the locations of the laser scanners being difficult to access e.g. due to the elevation of the location from the ground. Due to personnel safety requirements, cleaning of the laser scanners necessitates stopping of the crane, which leads to stopping also other crane(s) working on the same stack of containers. This reduces the operational efficiency of the cargo handling.

BRIEF DESCRIPTION OF SOME EMBODIMENTS

An object of the invention is to provide a solution to at least part of the above disadvantages. The object is achieved by an optical measurement device, a load handling apparatus and methods which are characterized by what is stated in the independent claims. The preferred embodiments of the invention are disclosed in the dependent claims.

According to an aspect there is provided an optical measurement device, comprising a permeable surface for communicating light to and from the optical measurement device, wherein a hydrophilic coating is arranged on the permeable surface.

According to an aspect there is provided a load handling apparatus, wherein the load handling apparatus comprises an optical measurement device according to an aspect, a drive system, and a controller operatively connected to the drive system and the optical measurement device, and configured to cause to obtain measurement information from the optical measurement device, and to drive the load handling apparatus on the basis of the measurement information.

According to an aspect there is provided a method for protecting an optical measurement device comprising a permeable surface for communicating light to and from the optical measurement device, the method comprising applying a hydrophilic coating to the permeable surface of optical measurement device.

According to an aspect there is provided a method for updating a load handling apparatus, comprising, installing the load handling apparatus an optical measurement device according to an aspect.

Some aspects provide improvements comprising improved accuracy of measurements. Improved accuracy of measurements provides reducing danger of collisions in load handling.

BRIEF DESCRIPTION OF THE DRAWINGS

The invention will now be described in greater detail by means of preferred working examples, with reference to the accompanying schematic and simplified drawings, in which:

FIG. 3 shows a bridge of a gantry crane, to which the invention may also be applied; and FIG. 4a illustrates an optical measurement device, according to an embodiment;

FIG. 4b illustrates a side view of the permeable surface of the optical measurement device according to an embodiment;

FIG. 5 illustrates an optical measurement device exposed to rain in a load handling apparatus.

DESCRIPTION

Figure 1:
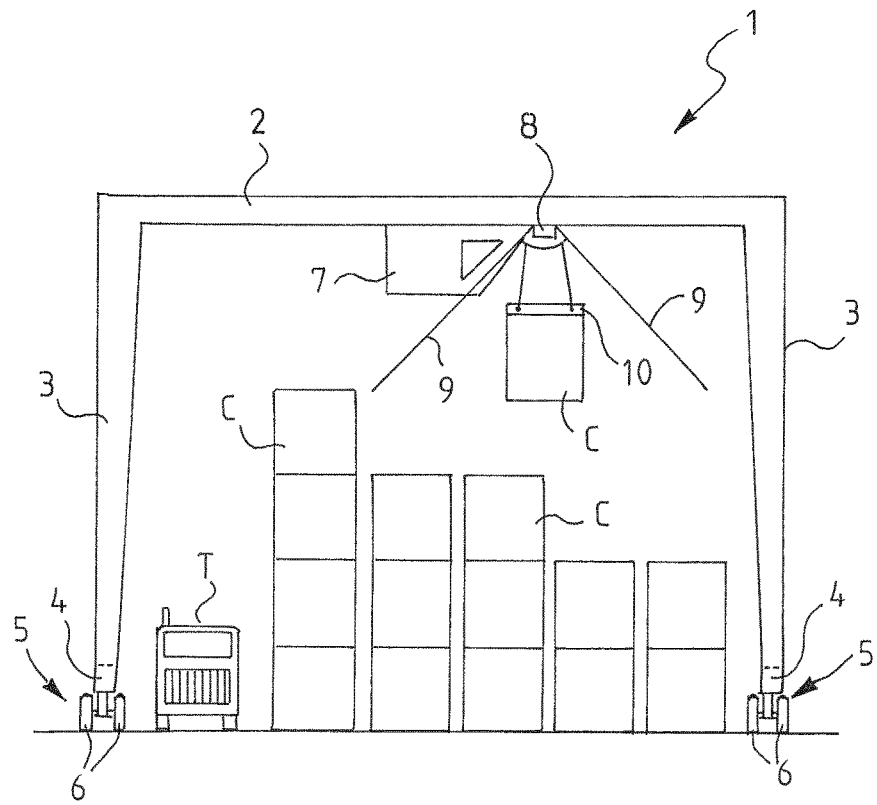
FIG. 1 is a side view of a gantry crane of the invention in its operating environment.
Figure 2:
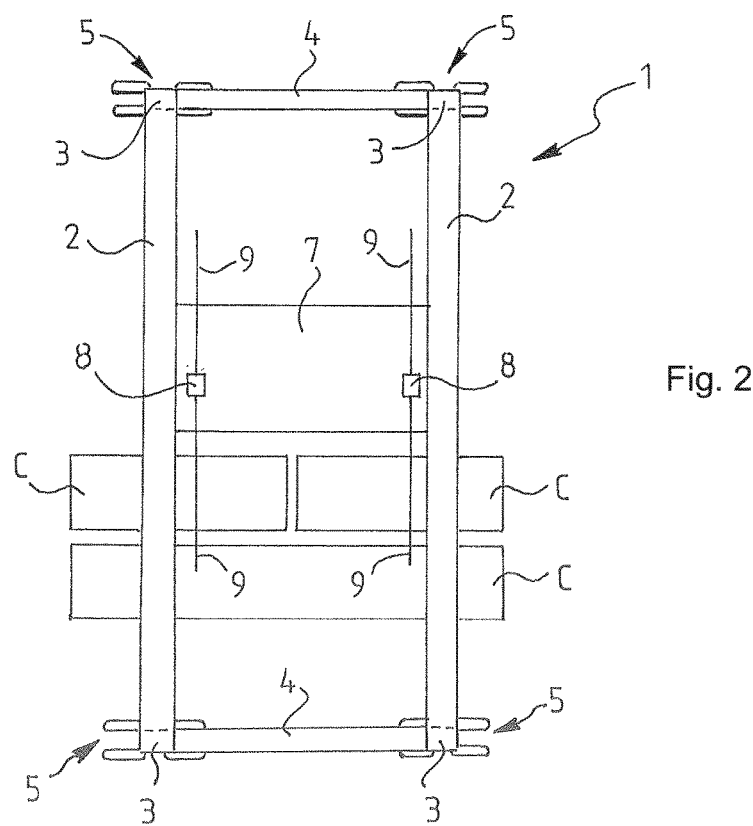
FIG. 2 is a top view of a gantry crane of the invention in its operating environment.

FIGS. 1, 2 and 3 illustrate an optical measurement device according to an embodiment installed to load handling apparatuses. FIGS. 1 and 2 show the main application of the invention, that is, a rubber-tyred gantry crane (RTG) 1 used extensively especially in ports. It typically comprises a framework with two horizontal top beams 2 at a distance from each other, vertical beams 3 connecting to the ends of each top beam 2, two bottom beams 4 transverse to the top beams 2 and connecting the bottom ends of the vertical beams 3 on opposite sides of the framework; wheeled 6 bogie structures 5 at the ends of both bottom beams 4; and a trolley 7 arranged to move along the top beams 2. The framework of the gantry crane may naturally also be of a different type, whereby the number and structure of its main beams may vary according to need and application.

FIGS. 1 and 2 show a typical situation in the operating environment of the crane 1 in a port. The space defined by the framework of the crane 1 has several rows of containers C of different heights and a truck T waiting on the truck lane for a container C to be loaded thereon. The crane comprises a loading member 10 that may be used to attach to containers for moving them. The loading member is connected to the trolley by ropes. The loading member may be lowered and lifted by a hoisting machinery. In this situation, a container C fastened to the trolley 7 must be moved safely to the waiting truck T in such a manner that it does not collide with the other containers C. The hoisting machinery may be used to elevate the loading member to a height that allows movement of the trolley and the loading member in picking up and stacking containers without collisions to containers and/or the truck. It should be appreciated that the load handling apparatus such as the crane may handle also other kinds of load than containers, and the various embodiments described herein are not limited to the handled load being a container.

According to the invention, at least one laser scanning device 8 is arranged in the trolley 7 for detecting obstacles in the manoeuvring space of the trolley and the attached load, herein a container C. The laser beams of the laser scanning device 8 are marked with reference number 9. The laser scanning device 8 scans continuously at specific directional angles of the laser beams 9 any obstacles, herein containers C, in the path of the trolley 7, possibly on an even wider path than a linear scanning path. The laser scanning device 8 receives continuously real-time information on distances of containers, and it is arranged to measure the height profile of the containers C in its manoeuvring space. Dodging containers C is thus possible without position information on the trolley 7, as earlier described. The laser scanning device 8 may be any suitable commercially available type, such as SICK LMS511.

Because on the path of the trolley 7, there may be obstacles of different lengths, herein containers C, typically 20- to 40-foot containers (FIG. 2), of which the 20-foot container may only be partly in the path of the trolley and, therefore, not detectable by a laser scanning device 8 mounted on one edge of the trolley 7, it is preferable that, as shown in FIG. 2, two laser scanning devices 8 are arranged on the trolley 7, one laser scanning device 8 on each side of the trolley 7 as seen in the direction of the path of the trolley 7. Both laser scanning devices 8 then measure the height profile of the containers C independently, whereby the scanning result is a combination of these two measurements and the highest profile always becomes the final measuring result. If necessary, there may be several laser scanning devices 8. If it is possible to otherwise ensure that containers C of only one size are stored in one container column, one laser scanning device 8 mounted in the middle of the trolley 7 is enough. Laser scanning should be used all the time from the lifting of the load, herein container C, to its lowering.

FIG. 3 shows a bridge of a gantry crane 1', in which a trolley 7' is arranged to move along main supports 2' that are at both ends supported to end supports 3', on which the main supports 2' and the trolley 7' are arranged to move sideways. In the trolley 7' of this crane, too, it is possible to arrange one or more laser scanning devices 8 in a corresponding manner and operation as in the gantry truck 1 described above, even though the operating environment, loads to be moved and obstacles on the path of the trolley 7' may differ considerably from the port conditions described above. The loading member is designated by reference number 10'. Preferably, the laser scanning device is attached to the loading member such that the laser scanning device may perform measurements close to the handled load. The loading member may be attached and detached to the load that is handled. Examples of the loading member comprise a hook and a spreader.

FIG. 4a illustrates an optical measurement device 400, according to an embodiment. The optical measurement device may be a laser scanning device for measuring distances to objects on the basis of reflected laser beams from objects. The distances may be used for determining location of handled load, for example containers.

The optical measurement comprises a permeable surface 406 for communicating light 414 to and from the optical measurement device and a hydrophilic coating 404, 408 is arranged on the permeable surface. The coating may be on both sides or only on one side of the permeable surface. A sensor 402 transmits light, e.g. a laser beam, through the permeable surface and receives reflections of the transmitted light from objects within a measurement range of the optical measurement device. The hydrophilic surface provides that water, e.g. direct rain or spatter of water, that is received on the permeable surface forms a thin film on the permeable surface. The optical measurement devise may have a housing 410 that protects the sensor in other directions, than the direction of the permeable surface, where the sensor communicates light. It should be appreciated that, the permeable surface may be arranged in all the directions, where the optical measurement device performs measurements. Accordingly, the housing may be replaced by the permeable surface, in those directions, where the measurements are performed. Preferably the permeable surface covers the whole surface of the laser scanner, such that the measurements may be performed in all directions.

Preferably the hydrophilic coating is a nanotechnical product that has nanoparticles that strongly attract water droplets and force them to form a small contact angle with the permeable surface. As a result the droplets flatten and merge into a uniform, transparent sheet rather than forming countless individual light-scattering spheres.

FIG. 4b illustrates a side view of the permeable surface of the optical measurement device according to an embodiment. The optical measurement device may be the optical measurement device of FIG. 4a. In the side-view, the light communicated through the permeable surface is illustrated by an arrow-headed dashed line. The permeable surface has a hydrophilic coating on at least one side of the surface. The coating may be also on both sides of the permeable surface as is illustrated in FIG. 4a. A water droplet 416 that is flattened by the hydrophilic coating is illustrated on the coating and the permeable surface. The water droplet form has contact angles $\alpha$ and $\beta$ with the permeable surface. The contact angle is determined by the hydrophilic properties of the coating and the contact angles is preferably between 0 and 9 degrees to keep inaccuracies caused by the water small in measurements.

When the coating is on the side of the permeable surface that is outside the measurement device, the hydrophilic effect causes the water drops received to the permeable to be flattened. The water may be received as rain from the sky or as spatter of water from nearby objects. The flattening reduces errors in the measurements caused by scattering and reflections.

On the other hand, in the inside of the measurement device, the permeable surface is not exposed to rain or spattering. However, a hydrophilic coating may be applied to the surface of the permeable surface that is inside the measurement device such that water drops caused to the permeable surface from fogging may be flattened. Fogging may be caused e.g. by fast temperature variations. It should be appreciated that fogging may also be caused to the side of the permeable surface that is outside the optical measurement device, whereby the coating provides flattening water drops caused by fogging also on the outside of the optical measurement device.

By flattening the water drops, drying time of the permeable surface may be reduced. Thus, the time of the permeable surface to dry and become substantially fully transparent after exposure to rain and/or rain spatter may be reduced. Moreover, fast drying of the permeable surface provides that evaporation of the water from the permeable surface which reduces forming of stains on the permeable surface.

In an embodiment a coating on the permeable surface is arranged to decompose organic molecules using photocatalysis. In this way the permeable surface may be cleaned by exposure of the permeable surface to Ultraviolet (UV) light. The decomposing of the organic molecules may be provided by $TiO_2$ particles in the coating.

In an embodiment the coating on the permeable surface is both hydrophilic and arranged to decompose organic molecules. Such a coating may be a nanotechnical product that comprises nanostructured $TiO_2$ particles of the size 1 to 100 nm. The particles may comprise nanostructured $TiO_2$ in anatase form, $WO_3$ and/or $SiO_2$. The nanostructured particles may be obtained from anatase for example by using hydrothermal synthesis resulting in nanotubes and nanoribbons.

FIG. 5 illustrates an optical measurement device 504 exposed to rain 510 in a load handling apparatus. The load handling apparatus may be a gantry crane, straddle carrier, fork lift or a reach stacker that are conventionally used in load handling e.g. in ports. The optical measurement device may be a laser scanning device in FIGS. 1 to 3 and arranged to measure distances to objects in the directions of movement of the loading member and/or the trolley.

Referring to FIG. 5, the optical measurement device has a permeable surface 506 directed upwards, e.g. to the sky, and a permeable surface 508 that is protected from direct rain. The protection may be provided by a cover and/or a direction of the permeable surface. In the illustration, the permeable surface is directed downwards, e.g. to the ground, to cover it from direct rain from the sky. The permeable surface may be a single surface that surrounds optical measurement device or the permeable surfaces may be separate surfaces.

It should be appreciated that the load handling apparatus may have different positions, where the permeable surface may be exposed to rain and/or protected from direct rain from the sky. Positions of the load handling apparatus may comprise a location of the load handling apparatus in a load handling area, a position of loading member with respect to surrounding structures in operating environment of the load handling apparatus and/or a position of the load handling apparatus with respect to load, e.g. container stacks, in the operating environment. In different positions of the load handling apparatus, the optical measurement device and/or the permeable surface may be protected from direct rain from the sky and/or rain spatter from the load handling apparatus 502 and/or a load handled by the load handling apparatus. Various surfaces of the load handling apparatus and/or the load may cause rain spatter to the permeable surface of the optical measurement device. Rain spatter from the surfaces may be received on the permeable surface particularly, when the surfaces are close, within a distance of less than one meter, to the permeable surface. In different positions of the load handling apparatus the surfaces may be moved to different distances, closer or away, from the permeable surface. In one example, an optical measurement device attached to a loading member may receive rain spatter from a load attached to the loading member. When the load is detached from the loading member, the detached load is located at a longer distance from the permeable surface than in the position of the load handling apparatus, where the load is attached to the loading member, and rain spatter to the permeable from the detached load surface may be reduced or even completely avoided.

In FIG. 5, the rain is shown by dashed lines that hit the permeable surface directed upwards and as spatter from the load handling apparatus 502 or a load handled by the load handling apparatus. When the optical measurement device is very close to an object that the optical measurement device is measuring a distance to, e.g. the load handling apparatus or the load, the optical measurement device is exposed to spatter from the object, when it is raining on the object. The optical measurement device is very close to the object when the optical measurement device is attached to a loading member, such that the optical measurement may be used to measure distances close to the handled load. The optical measurement device may be attached to a loading member, for example a spreader. Examples of the loading members are illustrated in FIGS. 1 to 3.

The spatter from the object may hit the permeable surface of the optical measurement device and introduce water on the permeable surface. The optical measurement device has preferably a hydrophilic coating on the permeable surface such that water received directly from the sky and from spatters can be flattened into a thin film according to the illustration of FIG. 4b. In this way the reflections and scattering of light from the water can be reduced such that reliability of measurements may be provided even when the optical measurement device is exposed to rain from the sky and spatter from nearby structures.

Although in FIG. 5, the permeable surface is directed upwards, also other directions are feasible. Accordingly, the direction of the permeable surface upwards is only one example. Other directions may be downwards and/or in a horizontal direction. In various directions of the permeable surface, the permeable surface may be exposed to rain and spatter from one or more surfaces that may include a surface, for example a surface of the loading member 10 in FIG. 1, of the load handling apparatus, a surface of the load, for example container C in FIG. 1, carried by the load handling apparatus, a surface of a co-located load handling apparatus. The co-located load handling apparatus may be one from at least two load handling apparatuses that are handling container close to one another. Further examples of surfaces are described by items illustrated in FIGS. 1 to 3, which may cause spatter to the optical measurement device.

The optical measurement device may measure distances in one or more directions of movement of the load handling apparatus. Depending on the type of the load handling apparatus, the distances may be measured to the load that is carried, to the structure of the load handling apparatus or to other objects that surround the load handling apparatus. In one example the optical measurement device measured distances in the vertical direction, where loads are hoisted, e.g. hoisting a container in the crane of FIGS. 1 and 2. In another example the optical measurement device may measure distances in the horizontal direction, where the loads are moved between different locations in a cargo handling area, e.g. a port.

Figure 6A:
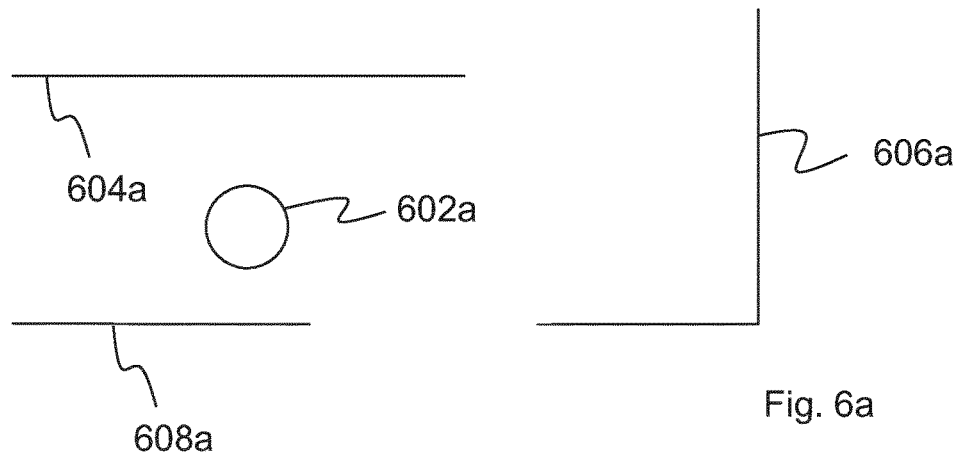
FIGS. 6a and 6b illustrate an effect on measurement results provided by an optical measurement device according to an embodiment.
Figure 6B:
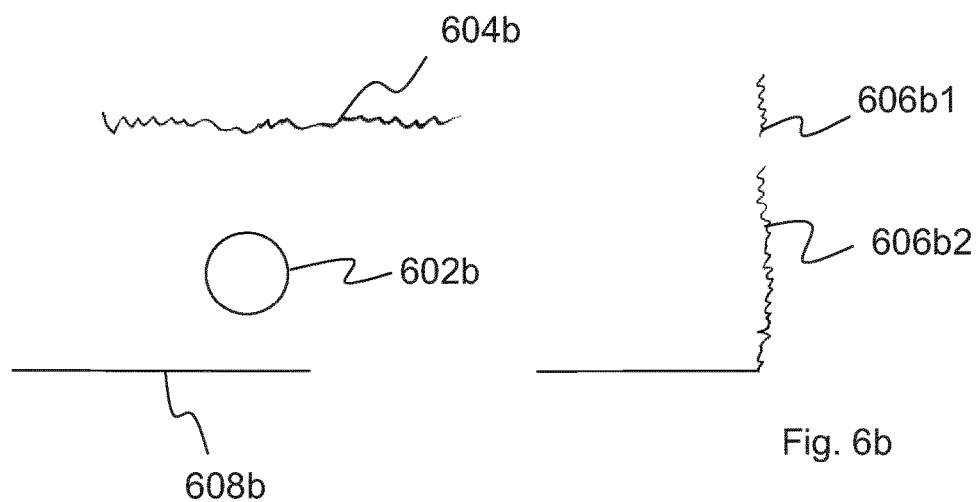

FIGS. 6a and 6b illustrate an effect on measurement results provided by an optical measurement device according to an embodiment. FIG. 6a illustrates measurement results obtained by an optical measurement device 602a that has a permeable surface comprising a hydrophilic coating according to an embodiment. FIG. 6b illustrates a conventional optical measurement device 602b without a hydrophilic coating on the permeable surface. The optical measurement devices in FIGS. 6a and 6b may be as described in FIG. 4a with the difference that the optical measurement device in FIG. 6b does not have a hydrophilic coating on the permeable surface. In FIG. 6b, a part of the permeable surface is subjected to water that forms drops on the permeable surface.

The optical measurement devices measure distances to objects on the basis of light and reflections of the light transmitted through the permeable surface. The optical measurement devices are in FIGS. 6a and 6b in exactly the same operating environment. Accordingly, structures to which distances are measured by the optical measurement devices are the same. The optical measurement devices are positioned to the same location with respect to the structures that form the operating environment of the optical measurement devices. The structures are may be straight walls that form a corridor and a corner in the corridor. The structures are visualized by the items illustrating measurement results obtained from the structures 604a, 606a, 608a, 604b, 606b1, 606b2, 608b. In FIG. 6a, the measurement results show substantially straight lines that illustrate the walls. In FIG. 6b, the measurement results have errors. The errors are shown by the lines 604b, 606b1 and 606b2 that are not straight, and one of the walls being in two separate parts 606b1, 606b2, whereas the same wall in FIG. 6a is in one continuous part. Measurement results from wall 608b are not distorted since water and dirt have not accumulated on the part of the permeable surface that is used to measure distances to that wall. Accordingly, the measurement results 604b, 606b1 and 606b2 compared with measurement results from corresponding 604a, 606a structures show improvement in the accuracy of the measurements thanks to the coating on the permeable surface of the optical measurement device. Measurement results from the corresponding structures 608a and 608b are substantially the same since the permeable surface of the optical measurement device 602b in FIG. 6b is not subjected to water in the direction towards the structure 608b.

An embodiment comprises a load handling apparatus that is installed an optical measurement device according to an embodiment. The load handling apparatus may comprise a drive system, and a controller operatively connected to the drive system and the optical measurement device. The drive system may transform power from a power source to mechanical movement of the load handling apparatus or a part of the load handling apparatus. In one example the drive system moves a trolley or a loading member in a crane e.g. those shown in FIGS. 1 to 3. The drive system may alternatively or additionally move the whole gantry crane, e.g. in a load handling area such as a port.

The controller may be configured to cause, to obtain measurement information from the optical measurement device, and drive the load handling apparatus on the basis of the measurement information. The controller may be a computer or Programmable Logic Controller (PLC) of the load handling apparatus. The controller may connect to the optical measurement device via a wired or wireless connection that may be provided by an internal communications bus of the load handling apparatus.

An embodiment comprises a method for updating an existing load handling apparatus. The method comprises installing the load handling apparatus an optical measurement device according to various embodiments described herein. The optical measurement device may be installed by conventional attaching means. The optical measurement device may be directed upwards, i.e. to the sky, to measure distances to objects that are above the measurement device. Thanks to the hydrophilic coating in the permeable surface it is possible to install the optical measurement device to a loading member of the gantry crane, e.g. the gantry crane in FIGS. 1 and 2. In this way the distances are measured from the loading member upwards to the trolley which are above the loading member. The structures above the loading member may be easily identified from the measurements, whereby the measurements may be easily applied to driving the loading member. Even if the distances were measured to other directions than upwards, for example downwards, or in a horizontal direction, the hydrophilic coating provides that spatters from nearby surfaces, for example the loading member and/or the cargo can be flattened into a thin film according to the description of various embodiments herein. Various embodiments described herein apply to load handling apparatuses such as gantry cranes, bridge cranes, straddle carriers, fork lifts, reach stacker or other corresponding devices or apparatuses that are capable of moving loads such as cargo and/or containers.

In various embodiments described herein a hydrophilic coating is used to protect an optical measurement device comprising a permeable surface for communicating light to and from the optical measurement device. The hydrophilic coating may be applied to the permeable surface by spraying or brushing for example. The hydrophilic coating may be a hydrophilic coating in an optical measurement device according to various embodiments described herein. The hydrophilic coating allows maintaining accuracy of measurements when the permeable surface is exposed to water, e.g. by direct rain or spatter. The hydrophilic coating may also be arranged to decompose organic molecules using photocatalysis such that the permeable surface is self-cleaning.

The above description of the invention is only intended to illustrate the basic idea of the invention. A person skilled in the art may thus vary its details within the scope of the accompanying claims. The crane types described above are thus only preferred examples of the application of the invention. Therefore, the invention is, in principle, suitable for any crane type, in which the trolley or a loading member or the like is used to handle load and an optical measurement device is used to determine distances for determining a location of the load. Various embodiments described herein provide determining location of the load in load handling more accurately, whereby danger of collisions may be reduced.

The invention claimed is:
1. A load handling apparatus comprising:
   an optical measurement device comprising:
      a permeable surface configured to communicate light to and from the optical measurement device; and
      a hydrophilic coating arranged on the permeable surface, wherein the coating is a nanotechnical product comprising nanostructured $TiO_2$ in anatase form,
   wherein the optical measurement device is configured to transmit light through the permeable surface and receive reflections of the transmitted light through the permeable surface,
   a drive system; and
   a controller operatively connected to the drive system and the optical measurement device, and configured to:

obtain measurement information from the optical measurement device; and drive the load handling apparatus on the basis of the measurement information.

2. The load handling apparatus according to claim 1, wherein the hydrophilic coating is arranged to decompose organic molecules using photocatalysis.

3. The load handling apparatus according to claim 1, wherein the optical measurement device is a laser scanner configured to measure distances in directions of the light communicated through the permeable surface.

4. The load handling apparatus according to claim 2, wherein the optical measurement device is a laser scanner configured to measure distances in directions of the light communicated through the permeable surface.

5. The load handling apparatus according to claim 1, wherein in at least one position of the load handling apparatus, the permeable surface of the optical measurement device is exposed to rain from the sky and rain spatter from a load handled by the load handling apparatus or rain spatter from a loading member.

6. The load handling apparatus according to claim 1, wherein the optical measurement device is installed to a loading member of the load handling apparatus.

7. The load handling apparatus according to claim 1, wherein the load handling apparatus is a gantry crane, bridge crane, straddle carrier, fork lift or a reach stacker.

8. A method for protecting an optical measurement device in a load handling apparatus comprising a permeable surface for communicating light to and from the optical measurement device, the method comprising:

applying a hydrophilic coating to the permeable surface of the optical measurement device, wherein the coating is a nanotechnical product comprising nanostructured $TiO_2$ in anatase form;

transmitting light via the optical measurement device through the permeable surface; and receiving reflections of the transmitted light at the optical measurement device through the permeable surface, wherein the hydrophilic coating is arranged to decompose organic molecules using photocatalysis, wherein the nanostructured $TiO_2$ includes nanotubes and nanoribbons, wherein the load handling apparatus further includes:
   a drive system; and
   a controller operatively connected to the drive system and the optical measurement device, and wherein the controller obtains measurement information from the optical measurement device and drives the load handling apparatus on the basis of the measurement information.

9. The method according to claim 8, wherein the hydrophilic coating is arranged to decompose organic molecules using photocatalysis.

10. The method according to claim 8, wherein the optical measurement device is a laser scanner configured to measure distances in directions of the light communicated through the permeable surface.

11. The method according to claim 8, wherein the optical measurement device is installed to measure distances upwards, downwards and/or in a horizontal direction, from the optical measurement device.

12. The method according to claim 10, wherein the optical measurement device is installed to measure distances upwards, downwards and/or in a horizontal direction, from the optical measurement device.

* * * * *